United States Patent
Wanderski et al.

(10) Patent No.: US 8,418,069 B2
(45) Date of Patent: Apr. 9, 2013

(54) SPINNING OFF CHAT THREADS

(75) Inventors: Anuphinh P. Wanderski, Durham, NC (US); John M. Lance, Littleton, MA (US); Andrew L. Schirmer, Andover, MA (US)

(73) Assignee: International Business Machines Corporation, Armonk, NY (US)

(*) Notice: Subject to any disclaimer, the term of this patent is extended or adjusted under 35 U.S.C. 154(b) by 374 days.

(21) Appl. No.: 11/537,119

(22) Filed: Sep. 29, 2006

(65) Prior Publication Data
US 2008/0082619 A1 Apr. 3, 2008

(51) Int. Cl.
*G06F 3/00* (2006.01)

(52) U.S. Cl.
USPC ........... 715/758; 715/751; 715/753; 715/842; 709/204

(58) Field of Classification Search .......... 715/758, 715/842, 751, 753
See application file for complete search history.

(56) References Cited

U.S. PATENT DOCUMENTS

| | | | | |
|---|---|---|---|---|
| 6,557,027 B1* | 4/2003 | Cragun | | 709/204 |
| 6,630,944 B1* | 10/2003 | Kakuta et al. | | 715/758 |
| 7,039,677 B2* | 5/2006 | Fitzpatrick et al. | | 709/204 |
| 7,111,044 B2* | 9/2006 | Lee | | 709/204 |
| 7,120,672 B1* | 10/2006 | Szeto et al. | | 709/206 |
| 7,127,685 B2* | 10/2006 | Canfield et al. | | 715/842 |
| 7,206,813 B2* | 4/2007 | Dunbar et al. | | 709/206 |
| 7,222,299 B1* | 5/2007 | Lim et al. | | 715/273 |
| 7,284,207 B2* | 10/2007 | Canfield et al. | | 715/842 |
| 7,356,567 B2* | 4/2008 | Odell et al. | | 709/206 |
| 7,600,184 B2* | 10/2009 | Smith et al. | | 715/244 |
| 7,861,175 B2* | 12/2010 | Wormald et al. | | 715/751 |
| 2002/0130904 A1 | 9/2002 | Becker et al. | | |
| 2003/0101343 A1 | 5/2003 | Eaton et al. | | |
| 2003/0212746 A1* | 11/2003 | Fitzpatrick et al. | | 709/206 |
| 2004/0078432 A1 | 4/2004 | Manber et al. | | |
| 2004/0078596 A1 | 4/2004 | Kent, Jr. et al. | | |
| 2005/0027696 A1 | 2/2005 | Swaminathan et al. | | |
| 2005/0097440 A1 | 5/2005 | Lusk et al. | | |
| 2005/0132009 A1 | 6/2005 | Solie | | |
| 2005/0149620 A1 | 7/2005 | Kirkland et al. | | |
| 2005/0223075 A1 | 10/2005 | Swearingen et al. | | |
| 2006/0031361 A1* | 2/2006 | Bailey et al. | | 709/206 |
| 2006/0090137 A1* | 4/2006 | Cheng et al. | | 715/758 |
| 2006/0149818 A1* | 7/2006 | Odell et al. | | 709/206 |
| 2006/0161852 A1* | 7/2006 | Chen et al. | | 715/758 |
| 2007/0174407 A1* | 7/2007 | Chen et al. | | 709/206 |
| 2007/0180040 A1* | 8/2007 | Etgen et al. | | 709/207 |
| 2007/0198645 A1* | 8/2007 | Chen et al. | | 709/207 |
| 2007/0208806 A1* | 9/2007 | Mordecai et al. | | 709/204 |
| 2007/0300159 A1* | 12/2007 | Kordun | | 715/733 |

OTHER PUBLICATIONS

Geyer et al., "Chat Spaces", Symposium on Designing Interactive Systems, 2004, pp. 333-336, Cambridge, MA.

* cited by examiner

*Primary Examiner* — Robert Stevens
*Assistant Examiner* — Patrick Riegler
(74) *Attorney, Agent, or Firm* — Hoffman Warnick LLC; Edward Choi

(57) ABSTRACT

A solution for providing an instant messaging (IM) space, such as for a chat session, is provided, which includes provisions for spinning off of chat threads. An embodiment of the invention provides a method of providing an IM space, the method comprising: providing a first graphical user interface (GUI) space for an IM conversation; obtaining a selected portion of the IM conversation represented on the first GUI; and creating a second GUI space for a second IM conversation based on the portion selected.

16 Claims, 5 Drawing Sheets

SPINNING OFF CHAT THREADS

FIELD OF THE INVENTION

Aspects of the invention relate generally to instant messaging (IM) sessions (e.g., chats), and more particularly, to the spinning off of chat threads.

BACKGROUND OF THE INVENTION

Current instant messaging (IM) sessions (e.g., chats) often become convoluted and difficult to navigate as threads become increasingly longer and more complex. As the chat continues, numerous participants can join and/or disengage from the chat further complicating the chat session. As time goes on and as various participants join/leave the chat, there is an ever increasing likelihood that the subject matter, and/or topic(s) of the chat become less centric and focused. That is, there is an increased likelihood that one, or more, participants find the instant chat is no longer on the precise topic he/she desires; there are too many participants; and/or various participants want to vary the topic to a different topic (be it modestly different or entirely different) than is currently existing with the chat. Further exacerbating this complexity is that starting a new and separate chat session by one, or more, participants is a complicated matter.

In view of the foregoing, a need exists to overcome one or more of the deficiencies in the related art.

BRIEF SUMMARY OF THE INVENTION

Aspects of the invention provide a solution for providing an instant messaging (IM) space, such as for a chat session, which includes provisions for spinning off of chat threads.

A first aspect of the invention provides a method of providing an instant messaging (IM) space, the method comprising: providing a first graphical user interface (GUI) space for an IM conversation; obtaining a selected portion of the IM conversation represented on the first GUI; and creating a second GUI space for a second IM conversation based on the portion selected.

A second aspect of the invention provides a system of providing an instant messaging (IM) space, the system comprising: a system for providing a first graphical user interface (GUI) space for an IM conversation; a system for obtaining a selected portion of the IM conversation represented on the first GUI; and a system for creating a second GUI space for a second IM conversation based on the portion selected.

A third aspect of the invention provides a computer program stored on a computer-readable medium, which when executed, enables a computer system to provide an instant messaging (IM) space, the computer program comprising program code for enabling the computer system to: provide a first graphical user interface (GUI) space for an IM conversation; obtain a selected portion of the IM conversation represented on the first GUI; and create a second GUI space for a second IM conversation based on the portion selected.

A fourth aspect of the invention provides a method for deploying an application for providing an instant messaging (IM) space, comprising: providing a computer infrastructure being operable to: provide a first graphical user interface (GUI) space for an IM conversation; obtain a selected portion of the IM conversation represented on the first GUI; and create a second GUI space for a second IM conversation based on the portion selected.

A fifth aspect of the invention provides computer software embodied in a propagated signal for providing an instant messaging (IM) space, the computer software comprising instructions to cause a computer system to perform the following functions: providing a first graphical user interface (GUI) space for an IM conversation; obtaining a selected portion of the IM conversation represented on the first GUI; and creating a second GUI space for a second IM conversation based on the portion selected.

A sixth aspect of the invention provides a business method for providing an instant messaging (IM) space, the business method comprising managing a computer system that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for providing an instant messaging (IM) space, such as for a chat session, which includes provisions for spinning off of chat threads. A method of providing an IM space includes providing a first graphical user interface (GUI) space for an IM conversation; obtaining a selected portion of the IM conversation represented on the first GUI; and creating a second GUI space for a second IM conversation based on the portion selected. A system for providing an IM space, a computer program stored on a computer-readable medium, a method for deploying an application for providing an IM space, computer software embodied in a propagated signal for providing an IM space, and a business method for providing an IM space also are disclosed.

The ability to break discussions out into a new "chat" has several distinct advantages including: allowing only the participants interested in that specific thread to focus on that discussion without the clutter or disturbance of the "parent" chat. Break-out chats will pull only those that participated in the original thread and can have a link to the original chat. Further, the original chat can remain intact. This allows users to break a thread out yet allow them to invite other users who might be interested in that particular topic without requiring the new users to filter out the non-related items.

Figure 1:
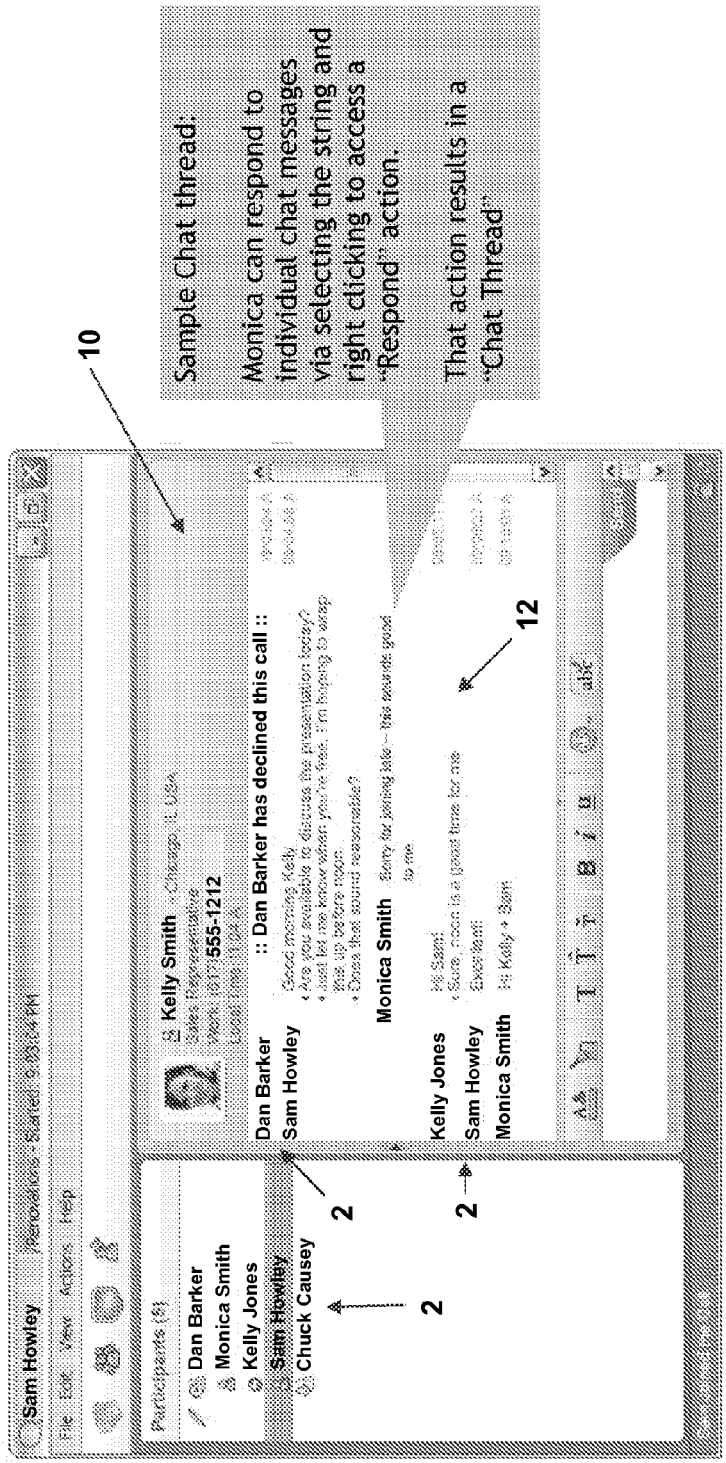
FIG. 1 shows a first graphical user interface (GUI) having an instant messaging (IM) space according to an embodiment of the invention.

Turning to the figures, FIG. 1 depicts a IM space that includes a first graphical user interface (GUI) 10 that allows for an IM conversation 12 between a plurality of participants 2. The IM space may indicate the particular participants 2 in the conversation, the various IM conversation 12, and/or other elements of information (e.g., time of string, whether a participant 2 is available, etc.). The IM conversation 12 includes, typically, at least one statement of text (i.e., "string") started by a first participant 2, with at least one other participant 2 responding to the first participant's 2 string with another string, and/or starting a new string unrelated to the first participant's 2 string. Over time, several participants 2 may enter (e.g., type) strings resulting in dialogue. Yet, over time, a "thread" (e.g., a set of strings related in some way) may develop in the IM conversation 12 that may interest a portion of participants 2 that is less than all the participants 2 in the IM conversation 12.

For example, FIG. 1 has five (5) participants 2 (i.e., Dan Barker, Chuck Causey, Sam Howley, Kelly Jones, and Monica Smith) conversing in the IM conversation 12. For example, participant 2, Dan Barker, has declined the call, as indicated. Participant 2, Sam Howley, in a first string says, "Good morning Kelly. Are you available to discuss the presentation today? Just let me know when you're free, I'm hoping to wrap this up before noon. Does this sound reasonable?" Participant 2, Kelly Jones responds to Sam Howley stating "Hi Sam! Sure, noon is a good time for me." Sam Howley then responds to Kelly Jones' response "Excellent!" Then, participant 2, Monica Smith, joins the IM conversation 12 by an introduction "Hi Kelly+Sam."

Participants 2 may respond to individual chat messages by, for example, selecting a particular string that they wish to respond to. For example, participant 2, Monica Smith, wants to respond to Sam Howley's first string (i.e., querying about a noon meeting) having possibly entered the IM conversation 12 later than the other participants 2. Monica Smith may create a chat thread by responding directly to Sam Howley's first string. A response may be created by selecting the string (e.g., Sam Howley's first string) and, for example, right clicking to access a "Respond" action selection. As depicted, Monica Smith's response is "Sorry for joining late—this sounds good to me", thereby starting a chat thread between Sam Howley and Monica Smith.

Figure 2:
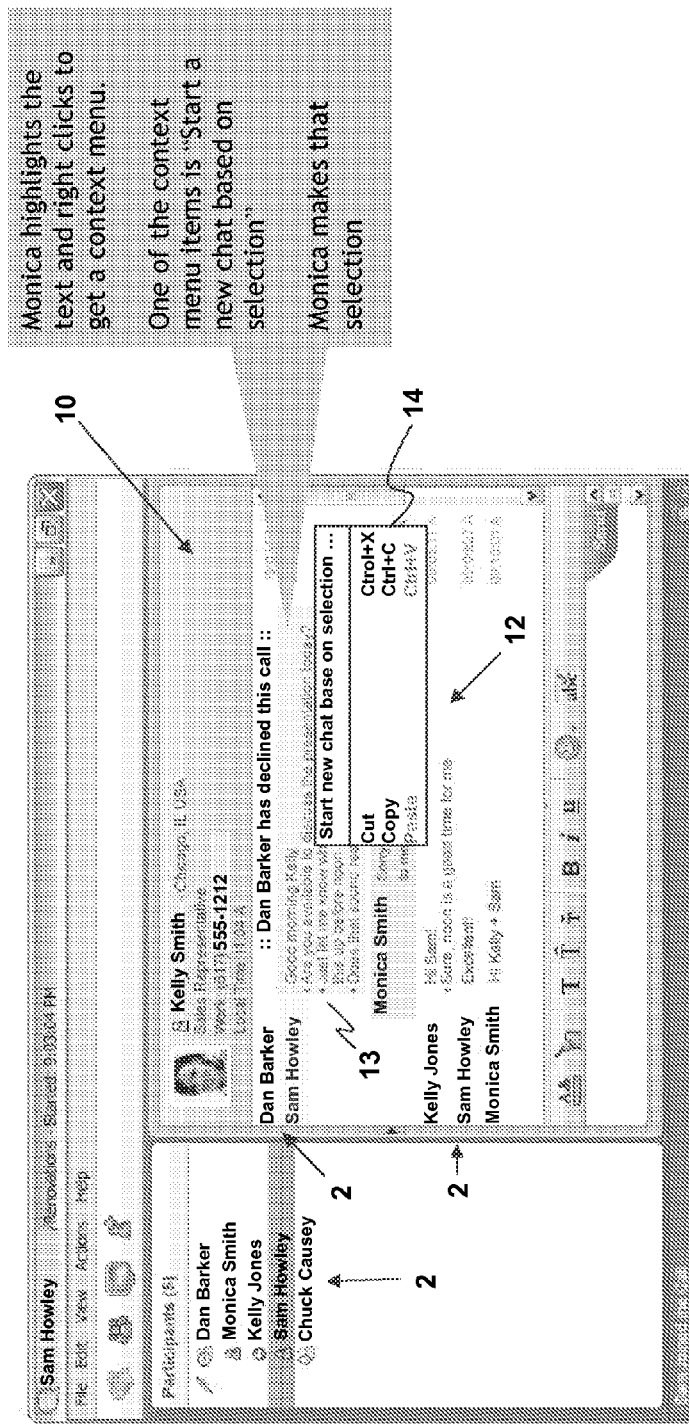
FIG. 2 shows the first GUI of FIG. 1 receiving a selection of a portion of the IM space according to an embodiment of the invention.

In any event, one or more participants 2 may desire to leave and spin off a chat thread from the first IM conversation 12 shown at the first GUI 10. This may be because, for example, Monica Smith wants to have an IM conversation only with Sam Howley. Under an embodiment of the present invention, a participant 2 may select a portion of the IM conversation 12 represented on the first GUI 10 for spinning off. As shown in FIG. 2, a selected portion 13 of the IM conversation 12 is obtained. In the example, Monica Smith has highlighted the selected portion 13 and right clicked, thereby opening a context menu 14. The context menu 14 includes various user-selectable options (e.g., "Cut", "Copy", "Paste", etc.).

Alternatively, the selected portion 13 may be selected by one, or a plurality of, participants 2 and/or by a third party (e.g., an observer who wishes to enter a conversation, a provider, etc.). Additionally, the selected portion 13 may be obtained by an entity selecting a portion of text (e.g., string), and/or by selecting a participant 2. In the latter embodiment, the entity selecting, rather than highlight a portion of text, may highlight a participant's 2 name (e.g., Sam Howley). In any event, the selected portion 13 of the IM conversation 12 may be obtained by a myriad of ways including an UI mechanism (e.g., spin off button, context menu option, etc.).

Figure 3:
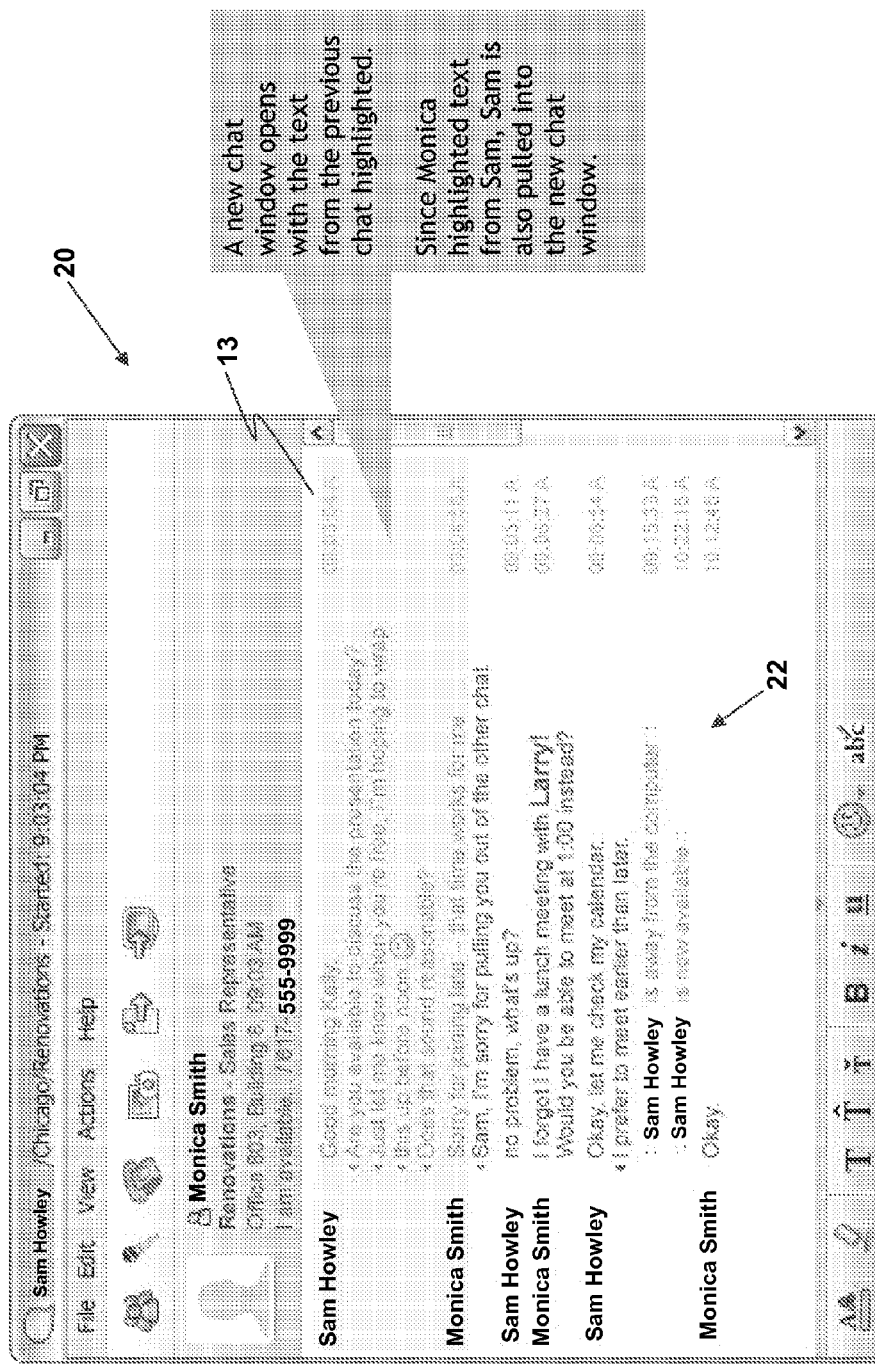
FIG. 3 shows a second GUI derived form the first GUI of FIGS. 1 and 2 according to an embodiment of the invention.

Once obtained, the selected portion 13 forms the basis of creating a second GUI space 20 for a second IM conversation 22, as shown in FIG. 3. The second GUI space 20 may be created via a user selection from the context menu 14 (e.g., clicking on selection "Start new chat base on selection" option)(FIG. 2) and/or may be automatically created just upon the selected portion 13 being obtained. In any event, a new chat window opens with the selected portion 13 (e.g., text strings) prepopulated therein. The selected portion 13 may include the text and/or the participants 2 from the first IM conversation 12 (FIG. 2). For example, the text from the first GUI space 10 (FIG. 2) is highlighted in the new second GUI space 20. As shown, the second IM conversation 22 is now continued by participants 2 who are added (e.g., moved, copied, etc.) at the second GUI space 20. Various indicia can be used to show which part of the second IM conversation 22 is the original selected portion 13 including highlighting, font type, spacing, text, icon, and/or the like.

For example, the second IM conversation 22 continues with threads such as Monica Smith stating "Sam, I'm sorry for pulling you out of the other chat." To which Sam Howley replies "no problem, what's up?" Monica Smith continues "I forgot I have a lunch meeting with Larry! Would you be able to meet at 1:00 instead?" Sam Howley replies "Okay, let me check my calendar. I prefer to meet earlier than later."

Once the second GUI space 20 is created, the first GUI space 10 is maintained intact with the first IM conversation 12 continuing. Participants 2 who are not added to the second GUI space 20 and second IM conversation 22 remain free to continue chatting at the first GUI space 10.

Further, an indicia may be provided at either the first GUI space 10 and/or the second GUI space 20 providing information related to the existence of the other respective GUI space 20, 10. The indicia may be a UI mechanism that the participant can click in order to view the original chat. If activated, the chat (i.e., first IM conversation 12) opens to the location at which the thread was spun off. As subsequent child threads are spun off, the new child may thread these various links so as to allow for a back tracking device (e.g., web-style bread crumbs). The indicia may also aid a participant 2 in a particular IM conversation 12, 22 to be able to readily switch and move to the opposing GUI space 10, 20 and the associated IM conversation 12, 22. Alternatively, the participants 2 in the second IM conversation 22 (i.e., Sam Howley and Monica Smith) may have an option to extend in invitation to other potentially interested participants 2 of the first IM conversation 12 (i.e., Dan Barker, Kelly Jones, and Chuck Causey).

Although in the example shown, a single IM conversation 22 is 'spun off' from a single 'parent' IM conversation 12, there is a virtual limitless number of combinations and/or quantities of IM conversations 22 that may be created from other IM conversations 12 under aspects of the present invention. For example, the second IM conversation 22 at the second GUI 20 can then elicit a third IM conversation (not shown) for spinning off. To aid in tracking the various IM conversations and/or GUI spaces available that are interrelated in any way, allows a GUI that employs a hierarchical view and/or listing depicting the relationship between GUI's, IM conversations, participants 2, and/or the like.

Figure 4:
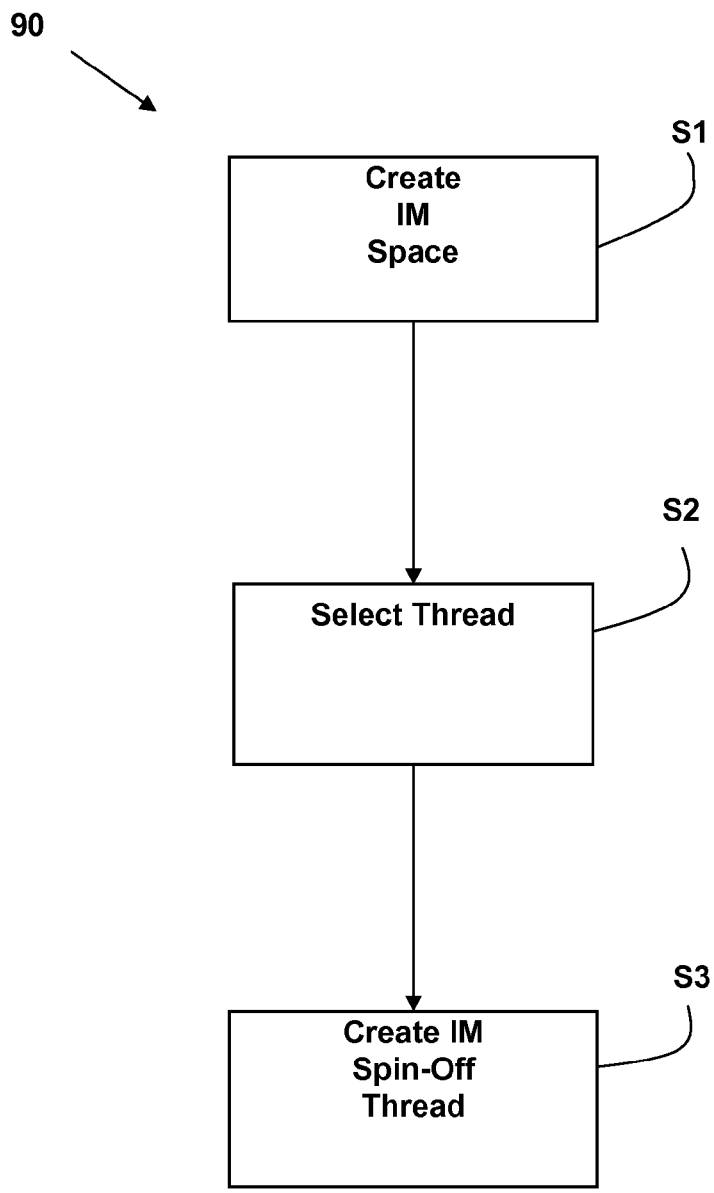
FIG. 4 shows a flow chart of a method of providing an IM space according to an embodiment of the invention.

Turning to FIG. 4, a flow chart of a method of providing an IM space according to an embodiment of the invention is shown. The method 90 includes process S1 which provides creating and/or providing a first GUI space 10 (FIGS. 1, 2) for an IM conversation. Process S2 provides obtaining a selected portion 13 (FIGS. 2, 3) of the IM conversation represented on the first GUI. Process S3 of the method 90 comprises creating a second GUI space 20 (FIG. 3) for a second IM conversation based on the portion selected (e.g., creating a spin-off thread).

Figure 5:
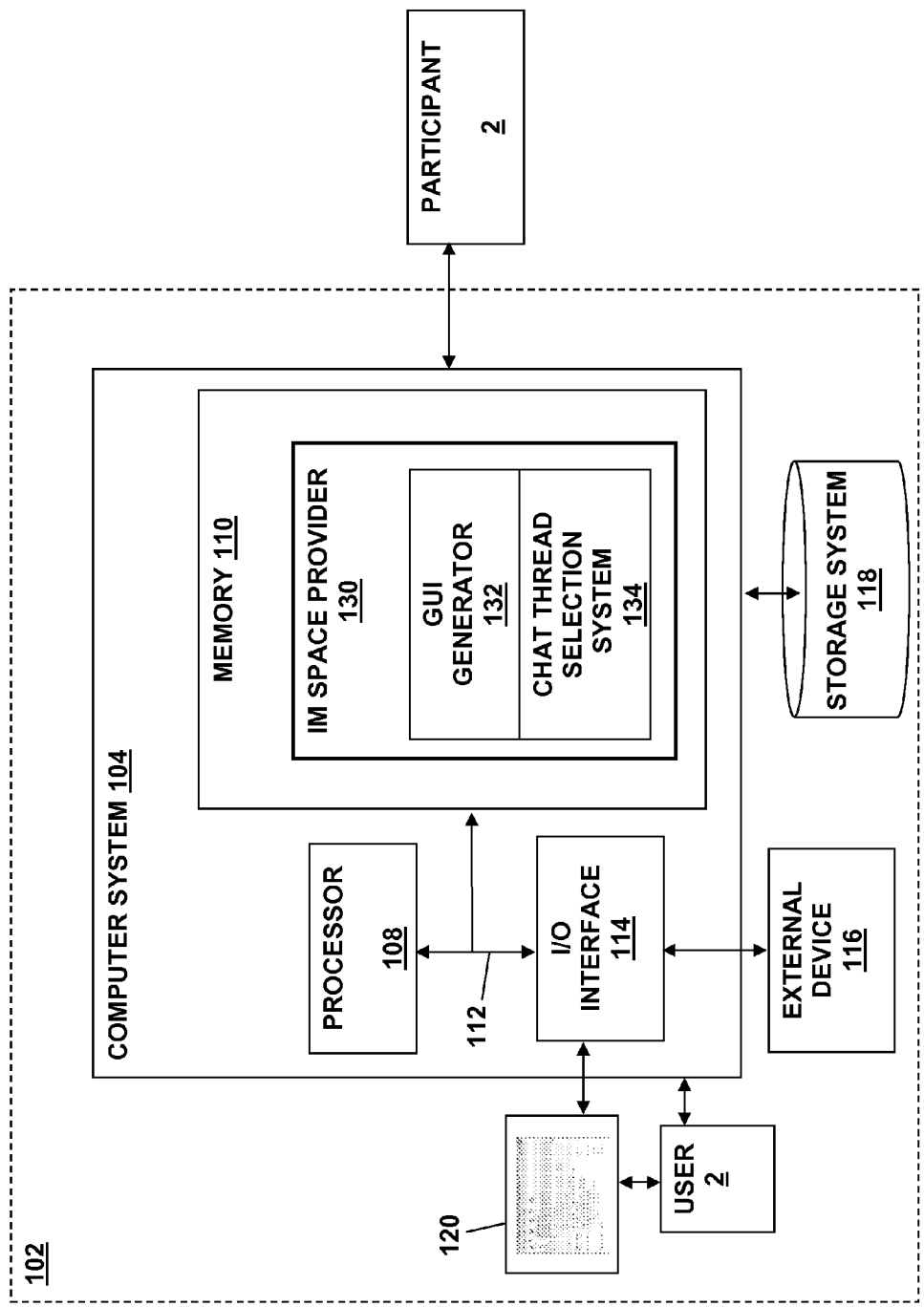
FIG. 5 shows an illustrative computer environment for providing an IM space according to an embodiment of the invention.

Turning to FIG. 5, an illustrative computer environment 102 having a computer system 104 is shown. Computer system 104 is shown including a processor 108, a memory 110, an input/output (I/O) interface 114, and a bus 112. Further, computer system 104 is shown in communication with an external I/O device/resource 116 and a storage system 118. In general, processor 108 executes program code, such as IM Space Provider 130, which is stored in a storage system, such as memory 110 and/or storage system 118. While executing program code, processor 108 can read and/or write data to/from memory 110, storage system 118, and/or I/O interface 114. Bus 112 provides a communications link between each of the components in computer system 104. I/O interface 114 can comprise any device that transfers information between a user 104 and/or another computing device and computer system 104. To this extent, I/O interface 114 can comprise a user I/O device to enable user 2 to interact with computer system 104 and/or a communications device to enable external device 116 to communicate with computer system 104 using any type of communications link.

In any event, computer system 104 can comprise any general purpose computing article of manufacture capable of executing program code installed thereon. However, it is understood that computer system 104 and IM Space Provider 130 are only representative of various possible equivalent computing devices that may perform the process described herein. To this extent, in other embodiments, the functionality provided by computer system 104 and IM Space Provider 130 can be implemented by a computing article of manufacture that includes any combination of general and/or specific purpose hardware and/or program code. In each embodiment, the program code and hardware can be created using standard programming and engineering techniques, respectively.

Similarly, computer environment 102 is only illustrative of various types of computer systems for implementing the invention. For example, in one embodiment, computer environment 102 comprises two or more computing devices that communicate over any type of communications link to perform the process described herein. Further, while performing the process described herein, one or more computing devices in computer environment 102 can communicate with one or more other computing devices external to computer environment 102 using any type of communications link. In either case, the communications link can comprise any combination of various types of wired and/or wireless links; comprise any combination of one or more types of networks; and/or utilize any combination of various types of transmission techniques and protocols.

As discussed herein, IM Space Provider 130 enables computer system 104 to provide an IM space that includes spinning off chat threads. To this extent, IM Space Provider 130 is shown including a GUI generator 132, and a chat thread selection system 134. The GUI generator 132 may provide various functions including providing a first GUI space for an IM conversation between participants, creating the second GUI space derived from the first GUI space, and/or the like. The GUI generator 132 may optionally include other system (s) to provide various functionalities including a system for providing an indicator on the second GUI as to which part is derived from the selected portion of the first GUI; a system for moving all the participants in the selected portion from the first GUI to the second GUI; and/or a system for amending the first GUI space with an indicia of the creation of the second GUI space. The chat thread selection system 134 may allow for user selection of a portion of the IM conversation in the first GUI thereby setting up for the spinning off of the chat thread, and/or the like. The chat thread selection system 134 may optionally include other system(s) to provide various functionalities including a system for selecting at least one participant form the first GUI and/or a system for selecting at least one text thread from the first GUI. The IM Space Provider 130 may optionally also include other system(s) to provide various functionalities including a system for maintaining the first GUI space intact after the spinning off of the chat thread; a system for providing a third GUI space having a hierarchical view; and/or a system for providing to a participant a selectable option to moving between the first, second, and/or third GUI's.

However, it is understood that some of the various systems shown in FIG. 5 can be implemented independently, combined, and/or stored in memory of one or more separate computing devices that are included in computer environment 102. Further, it is understood that some of the systems and/or functionality may not be implemented, or additional systems and/or functionality may be included as part of computer environment 102. Regardless, an embodiment of the invention provides a solution for IM space(s) to spin off chat threads.

While shown and described herein as a method and system for providing an IM space, it is understood that the invention further provides various alternative embodiments. For example, in one embodiment, the invention provides a computer program stored on a computer-readable medium, which when executed, enables a computer system to provide an IM space. To this extent, the computer-readable medium includes program code, such as IM Space Provider 130 (FIG. 5), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, as a data signal traveling over a network (e.g., during a wired/wireless electronic distribution of the computer program), on paper (e.g., capable of being scanned and converted to electronic data), and/or the like.

In another embodiment, the invention provides a method for deploying an application for providing an instant messaging (IM) space. In this case, a computer system, such as computer environment 102 (FIG. 5), can be obtained (e.g., created, maintained, having made available to, etc.) and one or more programs/systems for performing the process described herein can be obtained (e.g., created, purchased, used, modified, etc.) and deployed to the computer environment 102. To this extent, the deployment can comprise one or more of: (1) installing program code on a computing device, such as computer system 104 (FIG. 5), from a computer-readable medium; (2) adding one or more computing devices to the computer system; and (3) incorporating and/or modifying one or more existing devices of the computer system, to enable the computer system 104 to perform the process described herein.

In still another embodiment, the invention provides a business method that performs the process described herein on a subscription, advertising, and/or fee basis. That is, a service provider, such as an Application Integrator, could offer to provide an IM space as described herein. In this case, the service provider can manage (e.g., create, maintain, support, etc.) a computer system, such as computer environment 102 (FIG. 5), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of providing an instant messaging (IM) space, the method comprising:
    providing a first graphical user interface (GUI) space for a first IM conversation;
    selecting a portion of the IM conversation;
    obtaining the selected portion of the first IM conversation represented on the first GUI space; and
    creating a second GUI space for a second IM conversation, the selected portion of the first IM conversation forming a basis of the second IM conversation,
    wherein the second GUI space opens with the selected portion of the first IM conversation pre-populated in the second IM conversation in the second GUI space, the selected portion including at least one text string from the first IM conversation, the second GUI space further including a link to the first IM conversation in the first GUI space,
    wherein the first IM conversation continues in the first GUI space after the creating the second GUI space for the second IM conversation,
    wherein the first GUI space further includes a first indicator for indicating which part of the first IM conversation forms the basis of the second IM conversation in the second GUI, and the second GUI space further includes a second indicator in the second GUI space, the second indicator indicating which part of the second IM conversation in the second GUI space is derived from the selected portion of the first IM conversation, the second indicator further persisting in the second GUI space when the second IM conversation continues,
    wherein each of the first indicator and the second indicator comprises at least one of: a formatting indicator, a typographical indicator, and an icon,
    wherein when the link is activated, the first GUI space opens to the location of the first indicator.

2. The method of claim 1, wherein the first GUI space and the second GUI space are not concurrently viewable.

3. The method of claim 1, wherein the obtaining further comprises at least one of selecting at least one participant from the first GUI and selecting at least one text thread from the first GUI.

4. The method of claim 1, wherein the portion entails a conversation between a plurality of participants.

5. The method of claim 1, wherein the creating automatically follows the obtaining.

6. The method of claim 1, wherein the creating further comprises adding all the participants in the portion from the first GUI to the second GUI.

7. The method of claim 1, further comprising providing a third GUI space that includes a hierarchical view of the first GUI space and the second GUI space.

8. The method of claim 1, providing a participant at one of the first GUI and the second GUI a selectable option for moving to an opposing one of the first GUI and the second GUI.

9. A system of providing an instant messaging (IM) space, the system comprising:
    a processor, the processor executing program code for:
    providing a first graphical user interface (GUI) space for a first IM conversation;
    selecting a portion of the IM conversation;
    obtaining the selected portion of the first IM conversation represented on the first GUI space; and
    creating a second GUI space for a second IM conversation, the selected portion of the first IM conversation forming a basis of the second IM conversation,
    wherein creating the second GUI space opens the second GUI space with the selected portion of the first IM conversation pre-populated in the second IM conversation, the selected portion including at least one text string from the first IM conversation, the second GUI space further including a link to the first IM conversation in the first GUI space,
    wherein the first IM conversation continues in the first GUI space after the creating the second GUI space for the second IM conversation,
    wherein the first GUI space further includes a first indicator for indicating which part of the first IM conversation forms the basis of the second IM conversation in the second GUI, and the second GUI space further includes a second indicator in the second GUI space, the second indicator indicating which part of the second IM conversation in the second GUI space is derived from the selected portion of the first IM conversation, the second indicator further persisting in the second GUI space when the second IM conversation continues,
    wherein each of the first indicator and the second indicator comprises at least one of: a formatting indicator, a typographical indicator, and an icon,
    wherein when the link is activated, the first GUI space opens to the location of the first indicator.

10. The system of claim 9, wherein the first GUI space and the second GUI space are not concurrently viewable.

11. The system of claim 9, wherein the system for obtaining further comprises at least one of a system for selecting at least one participant from the first GUI and a system for selecting at least one text thread from the first GUI.

12. The system of claim 9, wherein the portion entails a conversation between a plurality of participants.

13. The system of claim 9, wherein the system for creating further comprises a system for one of adding all the participants in the portion from the first GUI to the second GUI.

14. The system of claim 9, further comprising a system for providing a third GUI space that includes a hierarchical view of the first GUI space and the second GUI space.

15. The system of claim 9, further comprising a system for providing a participant at one of the first GUI and the second GUI a selectable option for moving to an opposing one of the first GUI and the second GUI.

16. A non-transitory computer-readable medium storing a computer program, which when executed, enables a computer system to provide an instant messaging (IM) space, the computer program comprising program code for enabling the computer system to:
- provide a first graphical user interface (GUI) space for an a first conversation;
- select a portion of the IM conversation;
- obtain the selected portion of the first IM conversation represented on the first GUI space; and
- create a second GUI space for a second IM conversation, the selected portion of the first IM conversation forming a basis of the second IM conversation,
- wherein the second GUI space opens with the selected portion of the first IM conversation pre-populated in the second IM conversation in the second GUI space, the selected portion including at least one text string from the first IM conversation, the second GUI space further including a link to the first IM conversation in the first GUI space,
- wherein the first IM conversation continues in the first GUI space after the creating the second GUI space for the second IM conversation,
- wherein the first GUI space further includes a first indicator for indicating which part of the first IM conversation forms the basis of the second IM conversation in the second GUI, and the second GUI space further includes a second indicator in the second GUI space, the second indicator indicating which part of the second IM conversation in the second GUI space is derived from the selected portion of the first IM conversation, the second indicator further persisting in the second GUI space when the second IM conversation continues
- wherein each of the first indicator and the second indicator comprises at least one of: a formatting indicator, a typographical indicator, and an icon,
- wherein when the link is activated, the first GUI space opens to the location of the first indicator.

* * * * *